(12) United States Patent
Pappas et al.

(10) Patent No.: US 11,001,794 B2
(45) Date of Patent: May 11, 2021

(54) PERFECT POUR DRINK MIXER

(71) Applicants: Christine Renee Pappas, Reno, NV (US); John Dispenza, Lacey, WA (US); Mark Alan Litman, Edina, MN (US)

(72) Inventors: Christine Renee Pappas, Reno, NV (US); John Dispenza, Lacey, WA (US); Mark Alan Litman, Edina, MN (US)

(*) Notice: Subject to any disclaimer, the term of this patent is extended or adjusted under 35 U.S.C. 154(b) by 400 days.

(21) Appl. No.: 15/966,110

(22) Filed: Apr. 30, 2018

(65) Prior Publication Data

US 2018/0353922 A1 Dec. 13, 2018

Related U.S. Application Data

(63) Continuation-in-part of application No. 14/662,558, filed on Mar. 19, 2015, now abandoned.

(51) Int. Cl.
*B01F 15/04* (2006.01)
*C12G 3/04* (2019.01)
(Continued)

(52) U.S. Cl.
CPC .............. *C12G 3/04* (2013.01); *A47J 43/27* (2013.01); *B01F 3/08* (2013.01); *B01F 3/0861* (2013.01); *B01F 13/0022* (2013.01); *B01F 15/0087* (2013.01); *B01F 15/0226* (2013.01); *B01F 15/0429* (2013.01); *B01F 15/0479* (2013.01); *B65D 81/3283* (2013.01); *B01F 2215/007* (2013.01)

(58) Field of Classification Search
CPC ........ C12G 3/04; A47J 43/27; B01F 15/0226; B01F 3/08; B01F 15/0479; B01F 15/0429; B01F 3/0861; B01F 13/0022; B01F 15/0087; B01F 2215/007; B65D 81/3283
USPC ...................................................... 222/144.5
See application file for complete search history.

(56) References Cited

U.S. PATENT DOCUMENTS 3,506,157 A * 4/1970 Dukess ................. B65D 35/22
222/94
4,893,729 A * 1/1990 Iggulden ................. A61K 8/02
222/134

(Continued)

*Primary Examiner* — Donnell A Long
(74) *Attorney, Agent, or Firm* — Mark A. Litman & Associates, P.A.

(57) ABSTRACT

The invention provides a multi-compartment container for storing and dispensing separately a plurality of consumable liquids that can be mixed in an accurate and repeatable manner. Each storage compartment within the container encloses a predetermined quantity of a consumable liquid, wherein the first compartment is filled with a first liquid and the other compartments are filled with second and third liquids. The individual storage compartments are structurally merged to form elongated dispensing compartments each with a first end and a second end, wherein a one-way outlet positioned at the first end and a one-way outlet located at the second end permits passage of liquid from the storage compartments into the corresponding dispensing compartments. Upon fully inverting the container, the designated outlet of each dispensing compartment is opened, wherein precise amounts of liquids in the first, second, and third compartments are dispensed at constant volume ratio using gravity.

17 Claims, 7 Drawing Sheets

(51) Int. Cl.
*B01F 3/08* (2006.01)
*B01F 13/00* (2006.01)
*B01F 15/00* (2006.01)
*A47J 43/27* (2006.01)
*B01F 15/02* (2006.01)
*B65D 81/32* (2006.01)

(56) References Cited

U.S. PATENT DOCUMENTS

| | | | | |
|---|---|---|---|---|
| 4,961,521 A * | 10/1990 | Eckman | ............... | A47G 19/24 128/203.15 |
| 5,143,261 A * | 9/1992 | Drobish | ............ | B65D 81/3216 222/129 |
| 5,469,992 A * | 11/1995 | Jenkins | ............... | A47G 19/34 222/185.1 |
| 5,495,962 A * | 3/1996 | Nomura | ............... | A47G 19/34 222/240 |
| 5,588,561 A * | 12/1996 | Ness | ..................... | A47G 19/02 206/217 |
| 5,918,781 A * | 7/1999 | Stinson | ............... | G01F 11/263 222/450 |
| 6,550,640 B2 * | 4/2003 | Smith | .................... | G01F 11/22 222/1 |
| 6,820,767 B2 * | 11/2004 | Nicholas | ............ | A47G 19/2205 222/132 |
| 6,913,777 B2 * | 7/2005 | Rebhorn | ............ | B65D 81/3288 426/394 |
| 7,950,550 B2 * | 5/2011 | Webster | ................ | B65D 47/04 222/370 |
| 8,695,836 B1 * | 4/2014 | Gregory | ............... | B65D 47/243 220/524 |
| 2003/0234062 A1 * | 12/2003 | Wei | ........................ | A47J 47/04 141/319 |
| 2007/0000953 A1 * | 1/2007 | Ranney | ................... | G01F 11/261 222/450 |
| 2016/0060004 A1 * | 3/2016 | Dunn | .................... | B65D 25/04 222/144.5 |
| 2016/0159636 A1 * | 6/2016 | Ismail | ................ | B67D 3/0041 222/1 |

* cited by examiner

PERFECT POUR DRINK MIXER

RELATED APPLICATION DATA

This Application claims priority under 35 USC 120 as a continuation-in-part application of U.S. patent application Ser. No. 14/662,558, filed 19 Mar. 2015, titled PERFECT POUR DRINK MIXER.

BACKGROUND OF THE INVENTION

1. Field of the Invention

The present invention relates generally to beverage containers, and more specifically to an apparatus for dispensing and mixing of consumable liquids in an exact and reliable manner.

2. Background of the Art

The preparation of cocktails usually involves mixing well-defined quantities of different, but specific consumable liquids, including an alcohol-containing liquid in a single drinking container. Typically, at least liquor is mixed and diluted with a non-alcoholic beverage. Such mixed drinks include martinis, manhattans, screwdrivers, daiquiris and gimlets, to name only a few examples of popular cocktails. For a mixed alcoholic beverage, typical ingredients include at least a mixing base of alcohol, such as vodka, gin, whiskey, or tequila; and fruit juice, tonic water, ginger ale, or some other nonalcoholic beverage that is mixed with the alcohol base. Most commercially available beverage containers require separate storage of mixed drink beverages. Aside from the glass or plastic bottles, metal cans or other containers that are used to store such ingredients, the mixed drink often is mixed in a cocktail shaker bottle before serving. The container is then shaken or stirred to produce the final beverage that is consumed. Electrical blenders are sometimes used. Other implements such as bottle openers, can openers, stirrers or measuring cups may also be needed. Preparing a mixed drink can therefore be a time consuming process, wherein a number of containers, ingredients and implements are used. It would therefore be advantageous to have a container that combines separate storage of consumable liquids together with an easy and reliable method of mixing said liquids. Accordingly, it would be desirable to provide a manually operable mixer and dispenser assembly, combining the features and advantages of both.

The prior art discloses a number of inventions attempting to reduce the need for multiple containers and/or to simplify the process of preparing mixed drinks. For example, attempts have been made to package separate ingredients into two separate compartments of a single container to prevent them from interacting with each other while they are transported, marketed, and stored prior to consumption. The container typically has a large, lower compartment filled with a first ingredient, and a smaller, upper compartment for holding a second ingredient. Means are provided for puncturing, breaking or otherwise opening the upper compartment so that its contents fall into the ingredient in the lower compartment. The upper compartment may then be discarded enabling the user to drink out of the lower compartment, as in U.S. Pat. No. 4,634,004. Alternatively, the upper compartment may be adapted for insertion of a straw, as disclosed in U.S. Pat. Nos. 5,772,017 4,408,690.

Compositions can also be dispensed using gravity in dual-compartment pouring containers. Examples include those described in U.S. Pat. Nos. 4,678,103, 4,958,749 and 4,585,150, wherein the user is required to lift and tip the container at a specific angle in order to achieve the correct ratio of the first to the second pouring compositions. The bottles described in the prior art also involve complicated designs required to achieve a constant dispensing ratio. Methods of packaging and preparing mixed drinks in dual-compartment containers have additional drawbacks, including that the packaging may be expensive and not reusable or recyclable. In addition, the choice of mixing ingredients may be limited by the combinations that are packaged together. Moreover, when a dual-compartment container is used, the contents may not mix together adequately when the ingredient in the upper compartment flows into the liquid in the lower compartment. Based on these multiple factors, there is a need for a method of packaging and preparing a mixed drink that offers simplicity, ease of use, a minimum of tools for preparing the drink, and flexibility for the consumer who wishes to add a preferred mixing base.

The prior art discloses various liquid dispensing systems that provide consumable beverages that typically are a mixture of previously stored concentrate and water. Storage of the liquid is usually within the dispensing system thus requiring expensive retail space. U.S. Pat. No. 5,056,686 discloses one such beverage dispensing system for providing a number of different flavored drinks mixed from concentrate and water. The system has a number of containers for storing different flavors of concentrate and a piping system to receive pressurized water. Each container is in fluid communication with a specific pump to create pneumatic pressure. Separate fluid supply lines extend from each pump to a dispensing head. Valves in the dispensing head control the discharge of fluid, so that when a selected beverage is desired, the appropriate concentrate and water are discharged simultaneously to ensure that the end beverage contains the appropriate mixture of concentrate and fluid.

The prior art also includes a number of hand-powered mixing devices. For example, U.S. Pat. No. 4,010,934 discloses a mixer and an impeller. U.S. Pat. No. 4,479,719 discloses a drink mixer comprising a container, base and preformed circular cover, wherein the cover and container are placed against the base to mix a drink. U.S. Pat. No. 5,358,330 discloses a manual ingredient blending device comprising two attached cylindrical containers between which are two adjustable screens for controlling and varying the mixing and blending of ingredients. U.S. Pat. No. 5,547,275 discloses a shaker and blender comprising a cylindrical container with an inserted blender.

U.S. Pat. No. 5,341,957 discloses a vending machine that automatically outputs a beverage into a cup in response to an operator's payment and selection of a beverage. A dispensing system functions to draw liquid ingredients from the disposable containers and selectively dispense a predefined or selected amount of liquid ingredient into a drinking cup.

U.S. Pat. No. 5,323,691 to Reese et al. discloses a frozen drink mixer for preparing blended beverages, in which an ice dispenser, liquid mix dispenser, and blender are combined into a single unit. The apparatus automatically delivers an appropriate amount of ice and liquid to the blender unit and turns on the blender at an appropriate time to prepare a frozen drink of selected size.

U.S. Pat. No. 8,181,781B2 to Gold discloses a multi-beverage packaging configuration which includes a plurality of base beverage containers, containing a first beverage which may be carbonated, with mix beverage containers containing beverage for separate consumption or mixing along with volumetric dispensers.

SUMMARY OF THE INVENTION

The present invention provides a multiple-compartment single container for dispensing consumable liquids at constant volume ratio, wherein said container comprises first, second and third storage compartments, and first, second and third dispensing compartments, wherein said storage compartments are connected to corresponding said dispensing compartments by corresponding first, second, and third one-way outlets that provide for the flow of liquids from the storage compartments into the corresponding dispensing compartments once the container is fully inverted. A means for operating the system of outlets is provided that comprises at least three channels capable of dispensing three different liquids from each of the storage compartments into each of the corresponding dispensing compartments. A second system of one-way outlets is provided for controlling the flow of liquids from each of the dispensing compartments through the container outlet prior to consumption.

In the method of the invention, liquids are dispensed from the storage compartments into the corresponding dispensing compartments inverting the container in accordance with the invention. For a given liquid, the flow rate may be expressed as a function of the height and width of each storage and dispensing compartment, cross-sectional area of fluid in each storage compartment, geometry of each outlet size and geometry, and the viscosity of the liquid in each compartment.

DETAILED DESCRIPTION OF THE INVENTION

There are numerous and alternative ways of describing the generic inventive concepts of the device and method of using the device described herein.

One description is as a multi-compartment container having a dispensing end and a bottom, the container my have a longitudinal axis and at least two separate liquid-storage compartments for storing at least two distinct consumable liquids, said liquid-storage compartments each having a respective at least first outlet for a first of the at least two liquid-storage compartments and at least second outlet for a second of the at least two liquid-storage compartments;

the multi-compartment container further may have a mixing tap for controlling the flow of liquid from each of said two separate liquid storage compartments into a liquid holding compartment, wherein controlled flow of liquid from each of said two separate liquid storage compartments into the liquid holding compartment forms a beverage liquid mixture and the respective at least first outlet and at least second outlet for each of the liquid-storage compartments are between respective liquid storage compartments and the liquid holding compartment;

the multi-compartment container further having a controllable flow restriction element that rotates about the longitudinal axis, controlling flow from the at least two separate liquid-storage compartments through the first outlet and the second outlet;

the container further having a dispensing tap which controls flow of the beverage liquid mixture out of the liquid holding compartment;

wherein when the first outlet and second outlet are disposed below the bottom of the container by inversion of the container, the two distinct consumable liquids are dispensed substantially simultaneously from the first outlet and the second outlet into the liquid holding compartment to form the beverage liquid mixture and the liquid holding compartment is constructed to temporarily prevent the beverage liquid mixture in the liquid holding compartment from flowing out of the liquid holding compartment; and, wherein the dispensing tap has an open position to allow flow of the beverage liquid mixture out of the liquid holding compartment and a closed position to prevent flow of the beverage liquid mixture out of the liquid holding compartment.

The container may include:

a) at least a first storage compartment containing a first liquid product and a second storage compartment containing a second liquid product, b) a holding compartment in controllable liquid flow communication with both the first storage compartment and the second storage compartment to receive and hold the first liquid product and the second liquid product from the first storage compartment and the second storage compartment to form a beverage liquid mixture in the holding compartment;

c) a first fluid control between the holding compartment is in controllable liquid flow communication with both the first storage compartment and the second storage compartment, wherein the first fluid control rotates about the longitudinal axis to either allow or prevent liquid flow from the first storage compartment and the second storage compartment into the holding compartment;

d) an outlet port from the holding compartment that allows flow of the beverage liquid mixture out of the holding compartment; and e) a second fluid control between the holding compartment and the outlet port; wherein the first fluid control and the second fluid control are operable such that when fluid flow is enabled from the first fluid control, fluid flow is disabled from the second fluid control.

The multi-compartment container may have flow rate of the two or more liquid products and the mixture out of respective compartments is controllable by providing different pressures between an inlet of the first compartment and outlet said first compartment. The pressure may be provided pneumatically or by pressure head created by height of the liquids in their respective storage compartments and gravity.

The multi-compartment container may have at least first, second and third liquid-storage compartments for storing three distinct liquids, the at least three liquid-storage compartments having the at least first outlet and the second outlet and a third outlet, respectively, and the controllable flow restriction element controlling flow through the first outlet, the second outlet and the third outlet into the liquid holding compartment. The container may have the liquid holding compartment constructed of separated at least first, second and third liquid holding compartments respectively connected to corresponding at least first, second and third storage compartments by corresponding first, second, and third one-way outlets. The second fluid control on the outlet port(s) has at least two positions. A first position prevents all flow out of the liquid holding compartment through the outlet port. A second position allows simultaneous flow from the separated first, second and third liquid holding compartments (e.g., by overlapping portions of all at least first, second and third liquid holding compartments). An advantage of separated and distinct liquid holding compartments is to reduce the potential for any backflow of a mixture of liquids in a single compartment into multiple ones of the original liquid storage compartments. By having the separated and distinct liquid holding compartments, each of those holding compartments may be limited to both open and closed ports to the storage compartments.

An alternative description is of a multi-compartment container having a dispensing end and a bottom. The container has at least two separate liquid-storage compartments for storing and dispensing at least two distinct consumable liquids. The liquid-storage compartments comprise a respective at least first outlet and at least second outlet. The container may have a mixing tap for controlling the flow of liquid from said liquid storage compartments into a liquid holding compartment and the respective at least first outlet and at least second outlet are between the liquid storage compartments and the liquid holding compartment for holding a beverage liquid from the liquid storage compartments. The container further may have a controllable flow restriction element controlling flow from the least two separate liquid-storage compartments through the first outlet and the second outlet. The container may further have a dispensing tap which controls flow of the beverage liquid mixture out of the liquid holding compartment. When the first outlet and second outlet are disposed below the bottom of the container by inversion of the container, the two distinct consumable liquids should be dispensed substantially simultaneously from the first outlet and second outlet into the liquid holding compartment. The liquid holding compartment is constructed to temporarily prevent the beverage liquid (the mixture of original consumable liquids from the multiple storage compartments) in the liquid holding compartment from flowing out of the liquid holding compartment. The dispensing tap has an open position to allow flow of the beverage liquid out of the liquid holding compartment and a closed position to prevent flow of the beverage liquid out of the liquid holding compartment to enable storage and then delivery of the beverage liquid.

A multi-compartment container as described directly above and elsewhere herein may have at least first, second and third liquid-storage compartments for storing three distinct liquids, the three liquid-storage compartments having the first outlet and the second outlet and a third outlet, respectively, and the controllable flow restriction element controlling flow through the first outlet, the second outlet and the third outlet into the liquid holding compartment.

A multi-compartment container may have a single rotatable element between the first, second and third storage compartments that simultaneously controls dispensing of said three distinct liquids into the liquid holding compartment. The rotatable element may be manually controlled, may be powered, may have a spring to force the element into a flow-closed or flow-open position, and the like.

A multi-compartment container as described herein may have the liquid holding compartment with separated first, second and third liquid holding compartments respectively connected to corresponding first, second and third storage compartments by corresponding first, second, and third one-way outlets. This type of multi-compartment container may be configured to provide for flow of liquids from said first, second and third storage compartments into said first, second and third dispensing compartments when said container is inverted between vertical and ±30 degrees from vertical. A hinged element (gravity and/or pressure controlled) over at least one end of each first, second, and third one-way outlets to restrict flow from respective first, second and third liquid dispensing compartments into respective first, second and third liquid storage compartments. Again, controls (manual or powered) may be present on an exterior surface of the container for controlling flow rate of liquids from respective liquid-storage compartments into the dispensing compartment prior to delivery of a final beverage mixture out of the multi-component container.

A method of dispensing consumable liquids from the multi-compartment container as described herein may include providing different consumable liquids into each of the at least first, second and third liquid-storage compartments, transferring portions of each of the three different consumable liquids separately through the respective first outlet, second outlet and third outlet into the corresponding dispensing compartments, preventing backflow of each of the three different consumable liquids in the corresponding dispensing compartments back into the liquid-storage compartments, and then dispensing each of the three different liquids simultaneously out of the dispensing compartments into a beverage holder. A method of operating the system of one-way outlets may be to have the liquids dispensed from respective liquid-storage compartments into corresponding dispensing compartments at a predetermined volume ratio in accordance with combinations of individual dispensing compartment properties selected from the group consisting of height and width of each delivery compartment, cross-sectional area of fluid in each compartment, geometry of each compartment, dispensing outlet cross-section area, and flow properties of each liquid in respective liquid storage compartments.

The multi-compartment containers described herein may have the various structural parts such as the liquid-storage compartment and delivery compartments and outlets and ports comprise plastic or glass to assist in transparency of the container to enable viewing of the compartments. The multi-compartment containers may have at least one liquid storage compartment or preferably the delivery compartment associated with a source of hydraulic pressure to assist flow of liquid. The multi-compartment container may have the (at least) first and second compartments containing different liquid products which are allowed to mix within the container in the delivery compartment as a single mixing area as the delivery compartment or be separately and volumetrically stored in separated and distinct delivery or holding compartments. The multi-compartment container may have individual flow controls for each different liquid-storage compartment which are configured to dispense each liquid from different liquid-storage compartments into the delivery compartment at predetermined controlled volume ratios. In one embodiments of the container technology described herein, external, manually adjustable individual flow controls for each different liquid-storage compartment are configured to dispense each liquid from different liquid-storage compartments at predetermined controlled volume ratios. These flow controls may be turnable plates, slideable covers, slideable plates, push-pull stops and the like that can be manually controlled from the outside of the container. Ratios of individual liquid product dispensed from a first liquid storage compartment and a second liquid-storage compartment into respective delivery compartments may typically be between 1:1 and 10:1, although where very small amounts or larger proportions of ingredients are used, these ranges may be exceeded. For example, where mixed beverage require a "dash" or "pinch" or "slice" of an ingredient or an olive, cherry, onion, etc., these may be added after the beverage liquid has been poured into the final drinking glass.

The present invention provides a multi-compartment container for storing and dispensing consumable liquids, which are kept separated from each other until mixing prior to consumption. The container can be configured to comprise any desired number of compartments in order to accommodate separately any desired numbers of liquids. Preferably, the container is pre-filled with measured amounts of various consumable liquids required for the preparation of typical servings of particular cocktails in conventional 750 ml or 1000 ml volume bottle containers. Examples of such cocktails include Ruby Relaxers, Pina Colada, Miami Vice, Mai Tai, Grateful Dead, Tokyo Tea, Long Island Tea, Surfer on Acid, Blue Hawaiian, Caribou Lou, Mojito, Adios Motherfucker, Jungle Juice, Strawberry Daiquiri, Scooby Snack, Lava Flow, Mint Julep, Southern Comfort Manhattan, Regular Manhattan, B-52 Bomber, Gimlet, Cucumber-Lemonade Chiller, Cosmopolitan, Lemon Drop, Apple Martini, Bloody Mary, Cape Cod, Salty Dog, Screwdriver, Sea Breeze, White Russian, and Margarita.

The container of the invention preferably is transparent and easily fabricated from any material chemically compatible with the liquids to be stored therein, including plastics such as PET, glass and metal alloys. Alternatively, if the components to be stored in the container are light-sensitive, the container is made of opaque material. The storage compartments of the container may be filled by automatic processing with measured amounts of various liquids at the time of manufacturing of the container. Alternatively, empty containers may be provided to the user to be filled by the user in accordance with their mixing and storing preferences.

Figure 1:
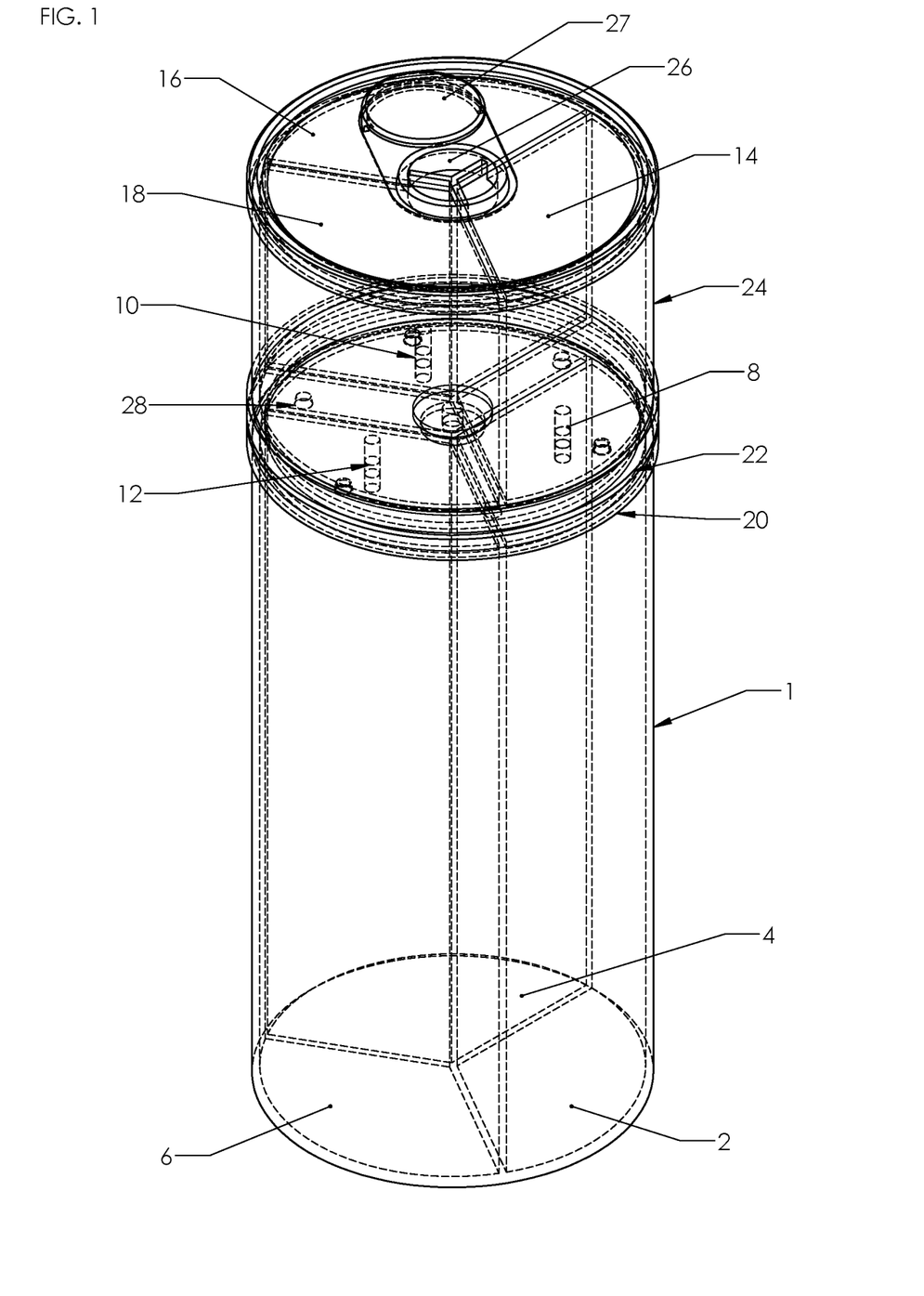
FIG. 1 is a perspective transparent view of an embodiment of the invention showing a container with three storage compartments and three dispensing compartments.

With reference to FIG. 1, the container 1 is substantially rigid, and comprises first (2), second (4) and third (6) storage compartments with different dimensions and geometries, corresponding to the volumes and compositions of the constituent liquids in a particular cocktail mix. The internal walls of each container preferably are in contact with the liquid stored in the adjacent compartment. Each compartment of the container is preferably provided with a venting hole e.g., 28) to allow for the escape of gas developed by the liquid during storage and equalization of pressure in the compartment once liquid has been dispensed through the opening.

The first (2), second (4), and third (6) storage compartments each have corresponding first (8), second (10) and third (12) one-way internal dispensing outlets, which connect with the corresponding first (14), second (16) and third (18) dispensing compartments. In a preferred embodiment of the invention, the storage compartments 2, 4, 6 are separated from the dispensing compartments 14 16 18 by a detachable screw-on cap (20) fitted with an O-ring sealer 22 within the inner perimeter of the storage compartments 2, 4, 6. In a further embodiment, the dispensing or holding compartments 14 16 18 comprise a tapered neck portion (24) of the container 1 which extends from the dispensing or holding compartments 14 16 18 to the top of the container. The neck portion 24 preferably contains near its upper end first (8), second (10), and third (12) external dispensing outlets, which enable dispensing of the liquids from the storage compartments 2, 4, 6 of the container by simple inversion of the container. The shape and size of each external dispensing tap 26 is dependent on the desired flow rate of the liquid from the corresponding dispensing compartment 14 16 18. The dispensing tap (26) at the top of the container allows dispensing of the liquids from each of the dispensing compartments once the container is fully inverted and the dispensing cap 27 for the dispensing tap 26 is opened. When the cap 27 is in a closed position and the container is inverted, the liquids flow into the corresponding dispensing compartment 14 16 18 and stored in an appropriate volume. The final volume of each liquid may be determined by combinations of individual dispensing compartment 14 16 18 volume and flow rate into the dispensing compartments 14 16 18 and the time of the flow. For example, if the dispensing compartments 14 16 18 were of equal size, but the proportions were to be 1:1:5, the respective first, second and third dispensing outlets 8, 10, 12 would have cross-section areas with respective dimensions of about 1:1:5, so that when the dispensing compartment 12 with the relative 5 proportion volume was filled, the container would be turned right side up, with the first, second and third dispensing outlets 8, 10, 12 closed by partial rotation of the lower O-ring 30 with respect5 to the detachable screw-on cap 20, thereby closing the respective first, second and third dispensing outlets 8, 10, 12.

With further reference to FIG. 1, the present invention provides a container for dispensing at least three liquids at constant volume ratio. The internal dispensing outlets 8, 10, 12 may provide a one-way valve means of controlling the flow of liquid from the storage compartments into the dispensing compartments 14, 16, 18 and through the external dispensing outlet 26 to the final beverage holder. The dispensing outlets 8, 10, 12 can be any valve system known to those skilled in the art, which is suitable for the present purpose. In an especially preferred embodiment of this invention, the dispensing outlets are one-way valves (see FIG. 5C) that seal each outlet when the container is not inverted.

Figure 2:
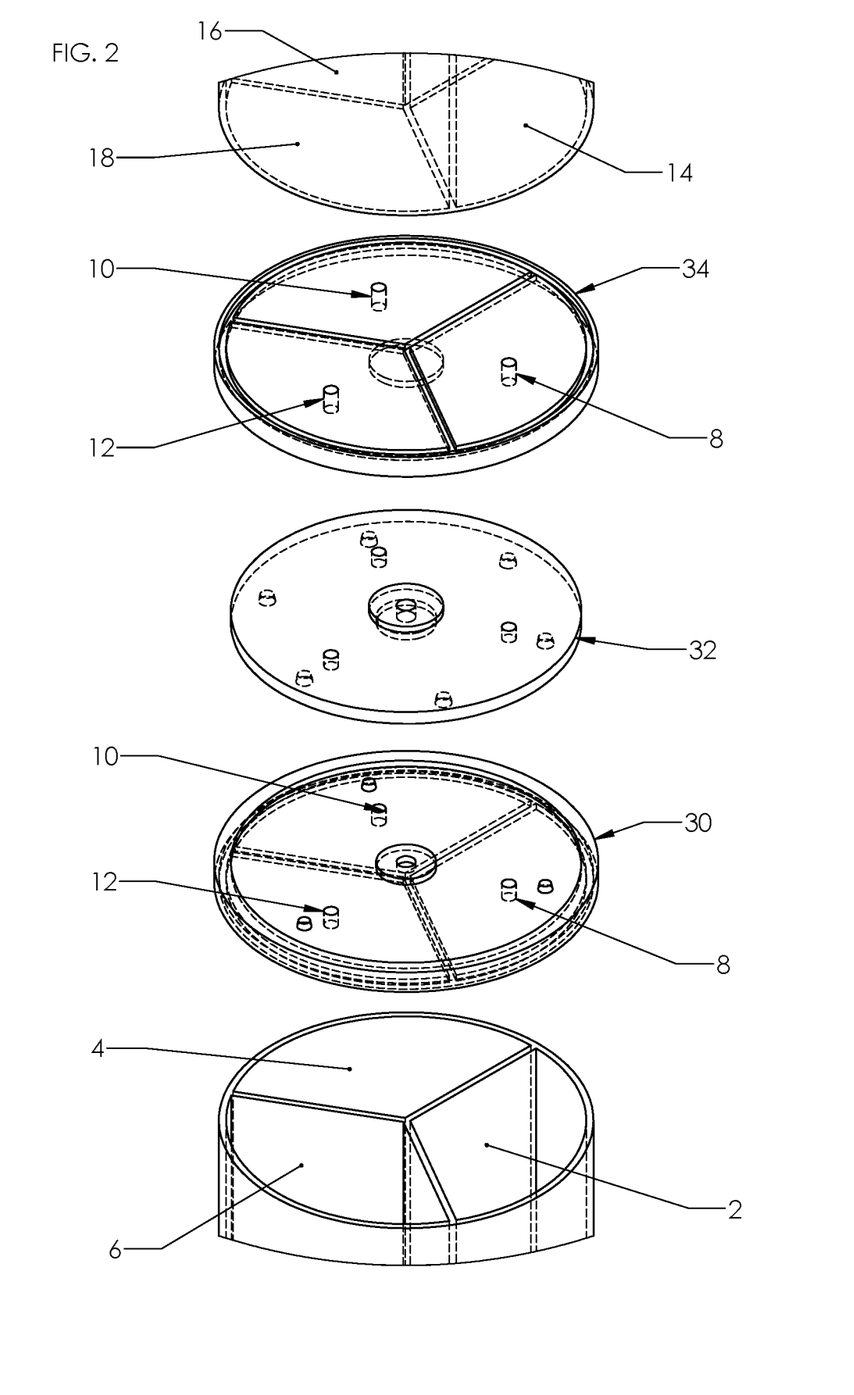
FIG. 2 is a perspective view of exploded components of an embodiment of the invention showing a container with three storage compartments and three dispensing compartments and three O-ring (or O-plate) fluid control elements.

With reference to FIG. 2, in an alternative embodiment of the invention, the first (2), second (4) and third (6) storage compartments are connected via corresponding first (8), second (10) and third (12) internal dispensing outlets to the first (14), second (16) and third (18) dispensing compartments that comprise a substantially cylindrical neck portion (24) of the container 1. Three external dispensing compartments 14, 16 18 are connected to the dispensing tap (26) at the top of the container 1. The shape and size of the external dispensing outlets is dependent on the desired flow rate of the product from the dispensing compartments or a single mixing compartment.

Figure 3:
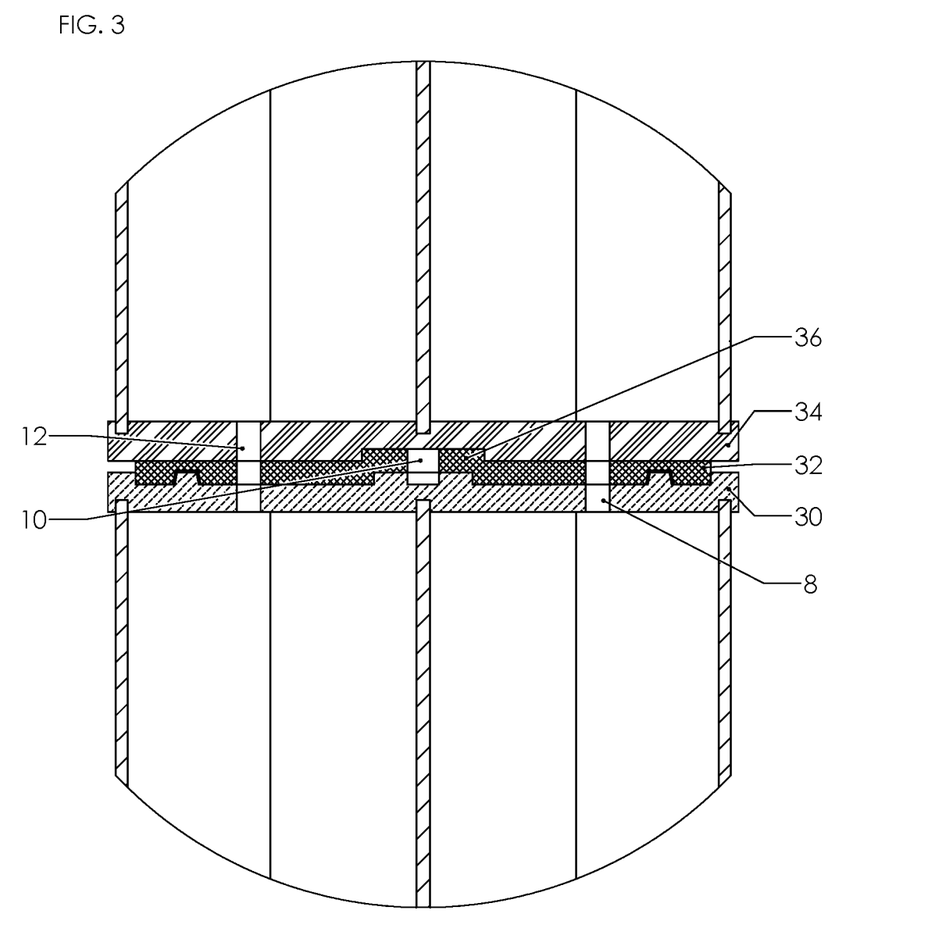
FIG. 3 is a frontal cutaway view of another embodiment of the invention showing a container with three storage compartments and the overlain three O-rings.

With reference to FIG. 3, in a further preferred embodiment of the invention, the first (2), second (4) and third (6) storage compartments connect via corresponding first (8), second (10) and third (12) internal dispensing outlets to respective dispensing compartments 14, 16, 18 or a single mixing chamber as a single dispensing compartment (14, 16, 18 without separators between the storage compartments), wherein the liquids dispensed from the storage compartments 2, 4, 6 are intentionally separated or mixed prior to dispensing from the dispensing tap (26 FIG. 1) upon inversion of the container 1. According to the method of the invention, the dispensing tap (26) may be sealed using a cap (27), for example a sliding cap or screw cap. When the container is to be used the cap (27) is opened or removed to make it possible for the consumer to use the dispensing tap (26). In an alternative preferred embodiment, additional liquids may also be provided by way of a refill pack from which new product is poured to refill the storage compartments 2, 4, 6 of the container or the refill packs of liquids may be inserted into the respective storage compartments 2, 4, 6 and puncture points at the bottom of the respective outlets 8, 10, 12 may be used to initially open the individual refill packs, which are then closed by movement of the O-ring sealer 22. Individual, separate O-rings (more properly termed O-plates, as they tend to be plates with holes therein) indicated as lower O-ring 20, middle O-ring 32 and upper O-ring 34 are shown, which rotate about a central axis (down the center of the view of FIG. 3). The three O-rings 30,m 32, 34 may rotate to align or place in non-alignment portions of the respective dispensing outlets 8, 10, 12 to allow or inhibit, or control or stop flow of liquid from the storage compartments 2, 4, 6 into the dispensing compartments 14, 16, 18. This is shown in perspective in FIG. 2.

Figure 4:
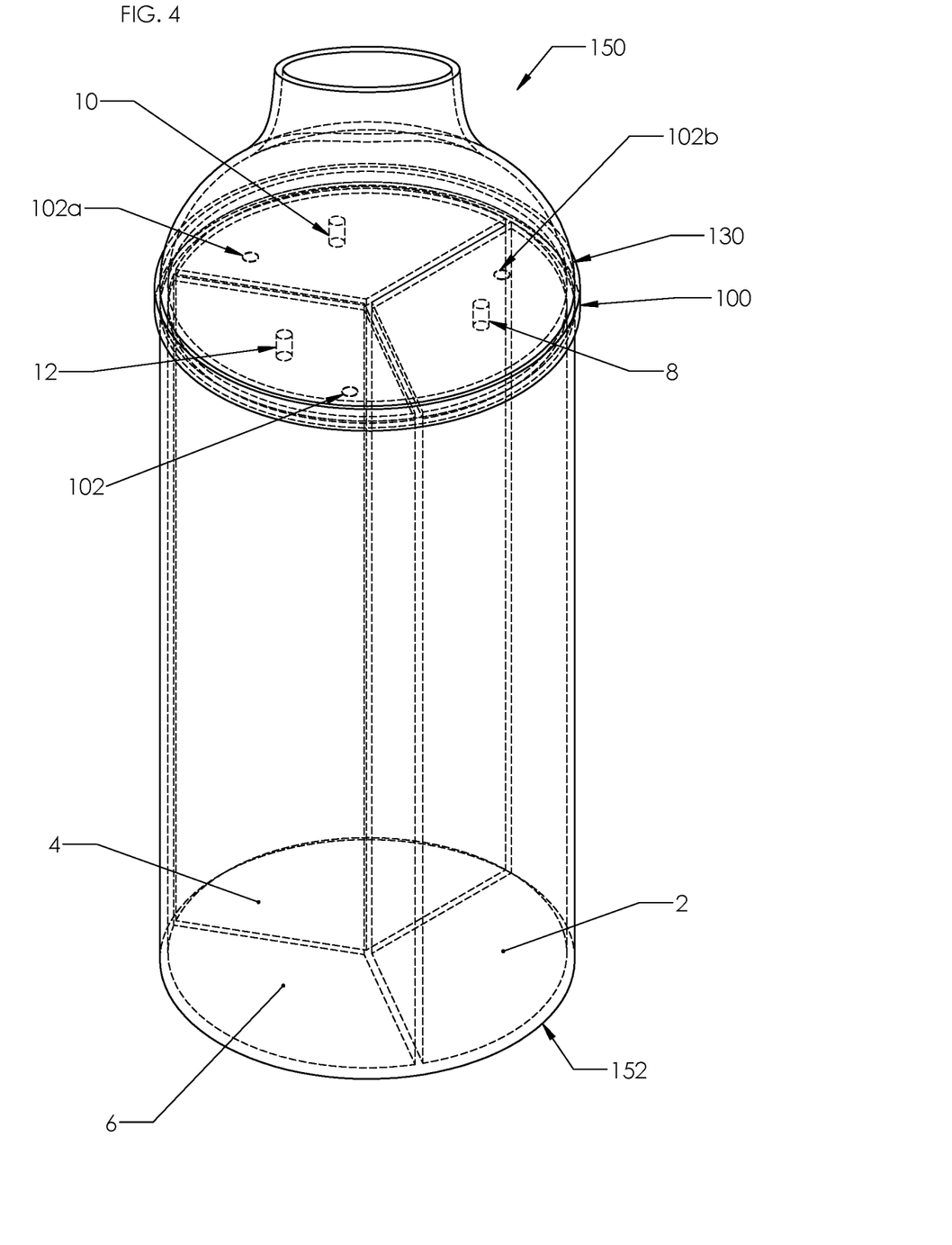
FIG. 4 is a perspective view of a further embodiment of the invention showing a container with three storage compartments and one dispensing compartment.

With reference to FIG. 4, according to another embodiment of the invention, the first (2), second (4) and third (6) storage compartments connect via corresponding first (8), second (10) and third (12) internal dispensing outlets to a substantially cylindrical single or multiple compartment mixing or dispensing chamber (14, 16, 18) in the neck 24 of the container 1, wherein the liquids dispensed from the storage compartments 2, 4, 6 are intentionally mixed or separately stored prior to dispensing from the dispensing tap (26) upon inversion of the container 1 and opening of the cap 27.

Figures 5, 5A:
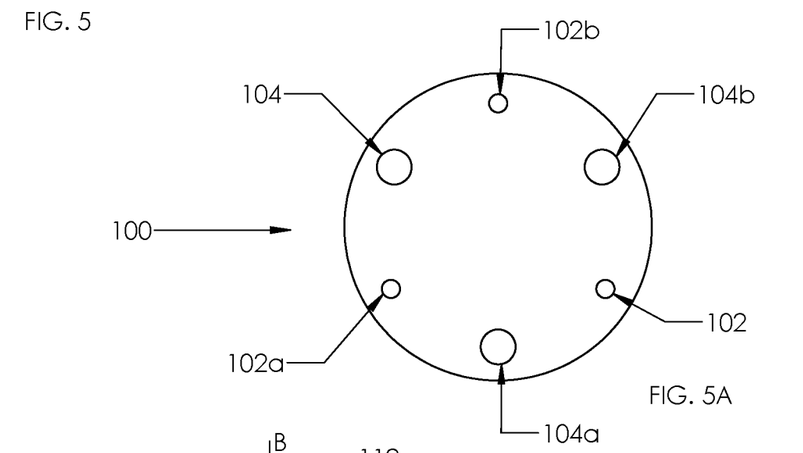
FIG. 5, having three components of FIG. 5A, FIG. 5B and FIG. 5C, shows three subcomponents of a container of the present invention.
FIG. 5A shows a top view of a restriction plate or O-ring.

The system of external and internal dispensing outlets may be operated in any suitable way, but preferably by rotating a collar as in FIG. 5A (100) on the container that mechanically opens and closes the outlets. Alternatively, the dispensing outlet 26 may be pressure operated to enable pressure to force the displacement of the valve to the open position. Conversely, when applied pressure is reduced, the valve of the dispensing outlet moves back to the closed position.

In the embodiments described above, wherein the container comprises more than two compartments, the dispensing tap preferably comprises as many external and internal dispensing outlets as there are compartments. The container optionally comprises at least one gripping means, which may, for example, be a handle. The handle may be integral to or an extension of the multiple-compartments. Alternatively the gripping means may comprise an area of the surface of the container which is modified to facilitate gripping by the user, for example, by texturing of the container surface to increase friction.

In the method of the invention, the process used for making a container depends on the size, shape and materials. In the case where the container is rigid, suitable manufacturing processes may be appropriately chosen by a skilled person. Such processes may include, but are not limited to injection molding, injection-blow-molding, or extrusion-blow-molding. In the case where the container is flexible and/or malleable, suitable manufacturing processes include, but are not limited to extrusion-blow-molding and injection-molding. In a preferred embodiment, the container is made by molding two separate compartments by any suitable means. In a further preferred embodiment, said molded compartments are then irreversibly joined to each other, using any suitable means.

Further in the method of the invention, the liquids stored in the first, second, and third compartments are preferably different liquids. In one especially preferred embodiment of the present invention, the liquids have different flow characteristics, such as, for example, different viscosities and densities. The liquids are preferably dispensed from the container at a constant volume ratio based on a gravity fluid model. More preferably the liquids are dispensed at a volume ratio of the first liquid in the first compartment to the second liquid in the second compartment to the third liquid in the third compartment of 1:1:1 to 100:10:1. Most preferably, the dispensing volume ratios are 3:1 to 5:1.

In a particularly preferred embodiment, the compartments of the container are designed so that the user can dispense a constant ratio of liquid product from the first compartment and the second compartment by maintaining a constant relationship between the flow rate of each liquid over time. If the liquid products have the same flow properties, then the compartments can be identical in order to dispense a 1:1 ratio of each liquid product. However, in the case where the desired ratio is not 1:1, or the flow properties of the compositions are not identical, then new compartment dimensions are required. According to the method of the invention, dispensing compartment geometry, fluid head of the composition, and cross sectional area of the dispensing outlet can be designed to provide a constant dispensing volume ratio in order to increase the volume of liquid dispensed per dispensing period in each compartment. In a preferred embodiment, an increase in the dispensing outlet of the compartment will create a higher volume flow rate space of the liquid in that compartment. In a further preferred embodiment, an increase in the head pressure of liquid in the compartment will result in higher volume flow. In a yet further preferred embodiment, an increase in the cross sectional area of the liquid in the compartment increases the liquid flow rate. Further in the method of the invention, for each dispensed volume of liquid, there is a quantitative volume flow relationship between the liquid in the first compartment and the liquid in the second and third compartments based on the liquid properties, outlet geometries, and cross section of each compartment.

Alternative descriptions of the containers and method of the present invention may be as shown in the FIG. 4 (and assisted by FIGS. 5A, 5B and 5C) as a multi-compartment container having a dispensing end 150 and a bottom 152, the container being configured for storing and dispensing at least two distinct consumable liquids from separate liquid-storage compartments 2, 4, (with a third optional liquid storage compartment 6), wherein said liquid-storage compartments comprise a respective first outlet 4 and second outlet 5 (and optional third outlet 12) and a dispensing tap or flow restrictor 100 (FIG. 5A) for controlling the flow of liquid from the storage compartments 2, 4, 6 into said dispensing volume or compartment 130 in the container, wherein when the first outlet 8 and second outlet 10 at the dispensing end 150 are disposed below the bottom 152 by inversion of the container) said consumable liquids are dispensed substantially simultaneously from the first outlet 8 and second outlet 10 and third outlet 12 into respective dispensing departments or the single mixing compartment 130, and a controllable flow restriction element 100 controls flow through the first outlet 8 and the second outlet 10 and the third outlet 12. The flow restriction element 100 which may be rotated (for example) to open, close, increase or decrease flow into or out of the outlets 48, 10, 12. The multi-compartment container may also have first, second and third liquid-storage compartments (as shown in FIG. 1) for storing said liquids prior to consumption, the liquid-storage compartments 2, 4, 6 having the first outlet 8 and the second outlet 10 and a third outlet 12, respectively, and the and controllable flow restriction element 100 controlling flow through the first outlet 8, the second outlet 10 and the third outlet 12.

The multi-compartment container is configured to provide for flow of liquids from said storage compartments into said dispensing compartments only when said container is inverted between vertical and ±30 degrees from vertical. This can be done flaps, gravity controlled stop valves, gravity controlled floating elements and the like over at least one end of the individual outlets 8, 10 and 12.

Figure 5B:
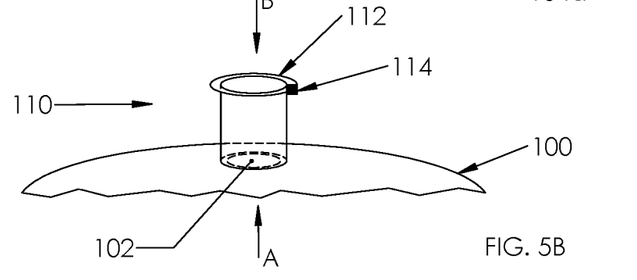
FIG. 5B shows a perspective cutaway view of a directional flow control element.

The multi-part container may have, as shown in FIG. 5B a hinged element 110 over at least one end of each first, second, and third one-way outlets 102 prevents flow from respective dispensing compartments into respective liquid-storage compartments. When flow or liquid pressure is in direction B, the hinged flap 112 is forced into a closed position. When flow or liquid pressure is in direction A, the hinged flap 112 is forced into an open position by the hinged flap 112 rotating about the hinge 114.

Figure 5C:
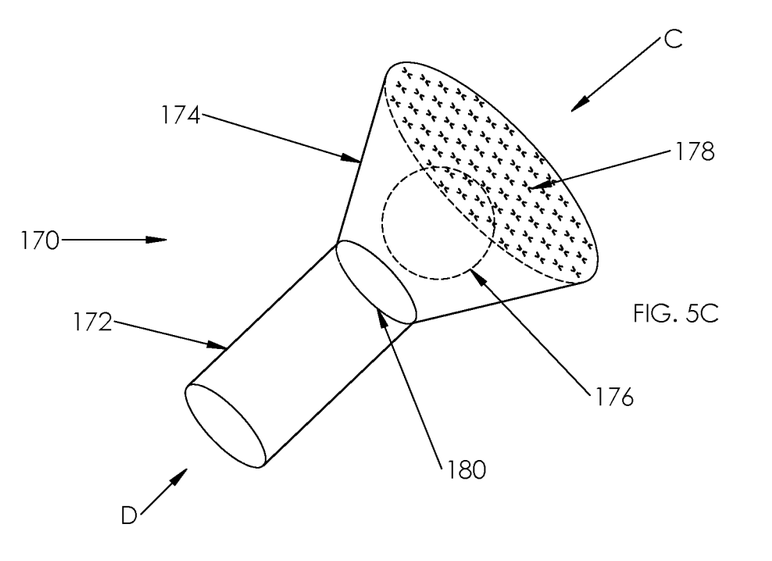
FIG. 5C shows a perspective transparency view of a directional flow control element.

An alternative flow control element 170 is shown in FIG. 5C. An outlet 172 has a funnel extension 174 within which is a moveable spherical element 176 that can move into and out of blocking position with respect to the opening 180 in the outlet 172. The spherical (or other geometric shape object) may move by flotation, gravity, flow energy and/or liquid pressure along directions A or B, with the movement controlled by a flow-penetrable retaining element 178.

An alternative manually controlled flow restrictor 100 is shown in FIG. 3A where the restrictor 100 may be rotated to control the alignment of various openings 104, 104a, 104b, 102, 102a and 102b to openings in respective outlets. The restrictor 100 may have the holes of various diameters or same diameters. Individual flow restrictors 100 may be designed for specific mixed drinks, with dimensions of holes configured so that when the holes 104, 104a, 104b, 102, 102a and 102b are aligned with outlets (not shown), the pressure from liquids in liquid-storage compartments when the container is in an inverted position will produce individual flow from individual liquid-storage compartments will be controllable and proportionate to dimensions of the holes, known viscosity of the respective liquids and the like. Therefore, if ratios of liquid components are to be, for example, in the range of 1:1, 2:1, 3:1, 4:1, 5:1 . . . 10:1, etc., the dimensions of the individual holes and respective holes for those specific ratios may be provided in specifically designed restrictors for each desired mixed drink. For example, assuming equal specific gravities, densities and viscosity for orange juice and vodka are the same, and the ratio or orange juice to vodka is 4:1, a restrictor may have two holes that under similar pressures (from equal heights of orange juice and vodka as liquids) flow at rates of 4:1. In this manner, no matter how long the container is inverted, the proportions of liquids will remain constant. Similar proportional flow controls in designed restrictors may be used for three or more liquids.

A method of dispensing consumable liquids from the multi-compartment container of this technology may provide different consumable liquids into each of the first, second and third liquid-storage compartments, transferring portions of each of the three consumable liquids separately through the respective first outlet, second outlet and third outlet (preferably, as described above, with restrictor controlled flow rates) into the corresponding dispensing compartments, preventing backflow of consumable liquids in the corresponding dispensing compartments into the liquid-storage compartments, and then dispensing each of the three liquids simultaneously out of the dispensing compartments into a beverage holder. The prevention of backflow may be performed by the elements of FIGS. 5A, 5B and/or 5C, with 5A being rotatable from external engagement through the container shell, with possible step locking hinged teeth 106 locking into receptors or preventing clockwise rotation.

Controls on the element in FIG. 5A may be present as finger gripped friction plates on an exterior surface of the container for controlling flow rate of liquids into each of the dispensing compartments prior to delivery out of the multi-component container prior to consumption. With the restrictor shown in FIG. 5A, holes may be perfectly aligned or partially aligned to control flow rates through the holes from the outlets. If the solid spaces between holes abut the outlets, there would be no flow. The system of one-way may be operated such that liquids are dispensed from respective liquid-storage compartments into corresponding dispensing compartments at a predetermined volume ratio in accordance with height and width of each delivery compartment, cross-sectional area of fluid in each compartment, geometry of each compartment, dispensing outlet size, and the flow properties of the liquid in each liquid storage compartment. In this modality, the compartments alone (rather than flow rates) determines proportions of liquid components. The combination of liquid delivery compartments in the container may be selected for desired volumes in specific mixed drinks. Again, specifically defined cells, compartments and the like for the containers may be specifically designed for individual mixed drinks. In FIG. 3, an insertable, replaceable cell having a volume may be inserted into the container. Each compartment 2, 4 and 6 may have respective replaceable cells which may be inserted into the respective chambers or liquid-storage compartments 2, 4 and 6 and individual outlets (shown, not numbered in FIG. 3) and more importantly individual delivery compartments 14, 16, 18 that are part of individual insertable, replaceable cells can functionally limit total volumes of individual liquids deliverable through opening or dispensing tap 26. A closing restrictor such as shown in FIG. 5A would be used to limit any further flow into individual delivery compartments 14, 16, 18 when the container is inverted to deliver the proportions of liquids in the different volume individual delivery compartments 14, 16 and 18 into a final beverage serving cup, glass or the like.

The multi-compartment container may have one or more component parts of the liquid-storage compartments, outlets, flaps, restrictors and delivery compartments made from plastic, galls, composites, metal and the like. At least one liquid storage compartment or delivery compartment may be associated with a source of hydraulic pressure to assist flow and flow rate of liquid. The first and second compartments may have different liquid products which are allowed to mix within the container in a single mixing area adjacent the delivery compartments.

Individual flow controls for each different liquid-storage compartment may be configured to dispense each liquid from different liquid-storage compartments at predetermined controlled volume ratios, as described above.

The multi-compartment container may provide ratios of different liquids, as described above with ratios of individual liquid product dispensed from a first liquid storage compartment and a second liquid-storage compartment into respective delivery compartments is between 1:1 and 10:1, such as 1:1 to 8:1, 1:1 to 1:2 to 1:4 (for three component), and other ratios within the generic range.

A multi-compartment container for dispensing two or more liquid products by gravity at predetermined volume ratios among the two or more liquid products may be constructed wherein said container has at least a first compartment and a second compartment each comprising a liquid product, wherein flow rate of each liquid product out of respective compartments is controllable by providing different pressures between an inlet of the first compartment and outlet said first compartment.

Figure 6:
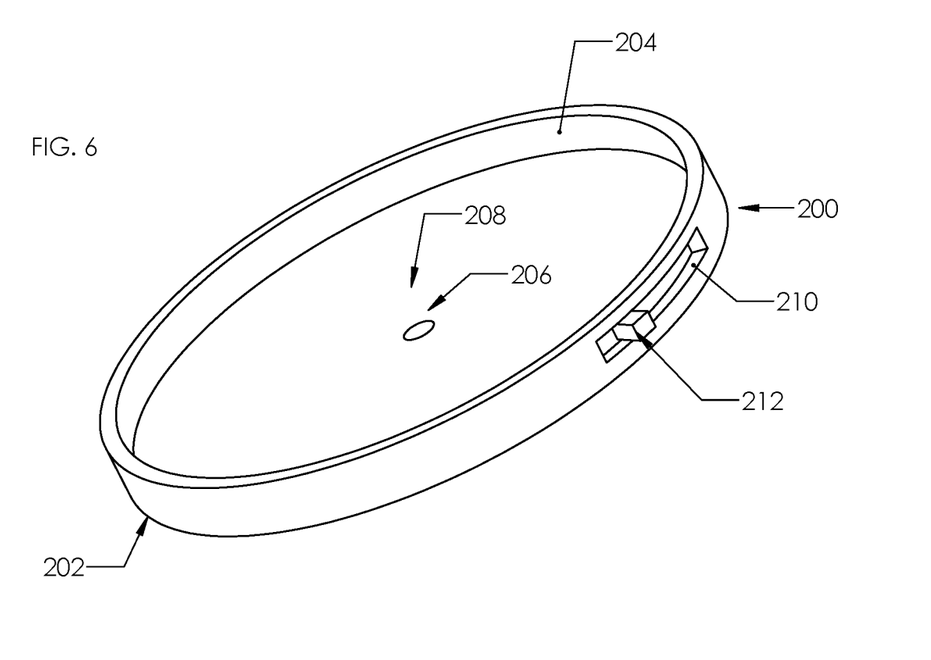
FIG. 6 shows a perspective view of an externally controllable directional control element.

FIG. 6 shows a perspective view of an externally controllable directional control element 200. The externally controllable directional control element 200 is shown with an outer casing 202 that screws or nests within the multi-compartment container (not shown) of the present technology. Within the outer casing 202 is the rotatable inner plate 204 having a through hole 206 and the upper opening 208. This rotatable inner plate 204 may be the O-ring plate 22 of FIG. 1. A difference between this embodiment and that of FIG. 1 is that a glide guide opening 210 is provided within the outer casing 202 that enables manual connection and control over rotation of the inner plate 204 using a manual slide control 212. As the slide control 212 is moved back and forth, the inner plate 202 is rotated to properly align or disconnect the through hole 206 to allow passage of liquid between chambers or compartments (not shown in this figure) within the multi-compartment container.

Figure 7:
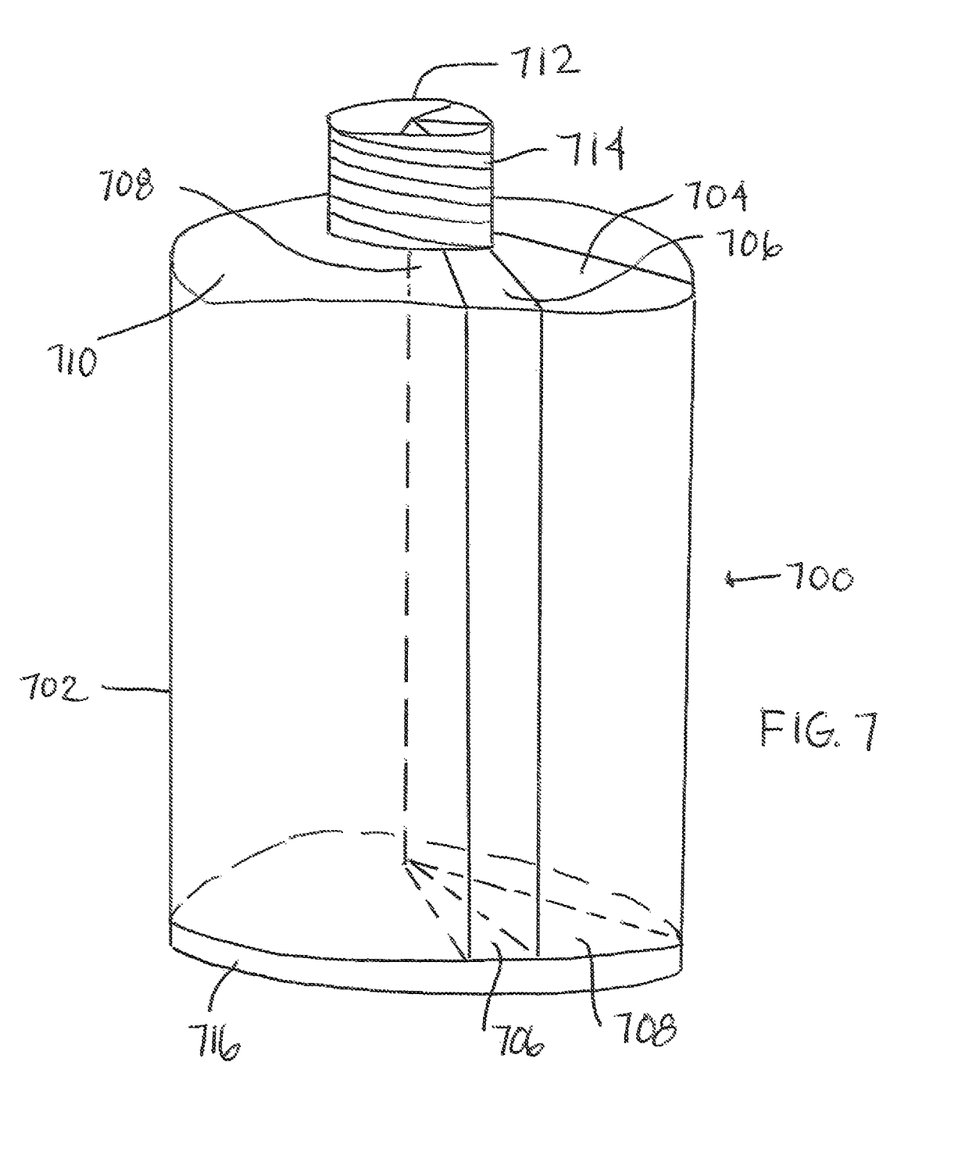
FIG. 7 is a perspective view of a further embodiment of the invention showing a container with three storage compartments and one dispensing compartment with a threaded top delivery outlet where a cap (not shown) may be engaged to close the top delivery outlet.

FIG. 7 is a perspective view of a further embodiment of the invention showing a container 700 with three storage compartments 704 706 710 and one dispensing compartment 712 with a threaded top delivery outlet 714 where a cap (not shown) may be engaged to close the top delivery outlet. A base plate 716 may be snapped into the main housing 702 to allow for cleaning and refilling of the three storage compartments 704 706 710. An internal separation wall 708 is shown between two storage compartments 706 710.

Variations in dimensions, materials, and shapes may be performed by the ordinary skilled artisan without deviating from the underlying scope of generic technology described and enabled herein.

What is claimed is:

1. A multi-compartment container having a dispensing end and a bottom,
the container having a longitudinal axis and at least two separate liquid-storage compartments for storing at least two distinct consumable liquids, said liquid-storage compartments each comprising a respective at least first outlet for a first of the at least two liquid-storage compartments and at least second outlet for a second of the at least two liquid-storage compartments;
the multi-compartment container further comprising a mixing tap for controlling the flow of liquid from each of said two separate liquid storage compartments into a liquid holding compartment, wherein controlled flow of liquid from each of said two separate liquid storage compartments into the liquid holding compartment forms a beverage liquid mixture and the respective at least first outlet and at least second outlet for each of the liquid-storage compartments are between respective liquid storage compartments and the liquid holding compartment;
the multi-compartment container further comprising a controllable flow restriction element that rotates about the longitudinal axis, controlling flow from the at least two separate liquid-storage compartments through the first outlet and the second outlet;
the container further comprising a dispensing tap which controls flow of the beverage liquid mixture out of the liquid holding compartment;
wherein when the first outlet and second outlet are disposed below the bottom of the container by inversion of the container, the two distinct consumable liquids are dispensed substantially simultaneously from the first outlet and the second outlet into the liquid holding compartment to form the beverage liquid mixture and the liquid holding compartment is constructed to temporarily prevent the beverage liquid mixture in the liquid holding compartment from flowing out of the liquid holding compartment; and,
wherein the dispensing tap has an open position to allow flow of the beverage liquid mixture out of the liquid holding compartment and a closed position to prevent flow of the beverage liquid mixture out of the liquid holding compartment.

2. A multi-compartment container according to claim 1 comprising first, second and third liquid-storage compartments for storing three distinct liquids, the three liquid-storage compartments having the first outlet and the second outlet and a third outlet, respectively, and the controllable flow restriction element controlling flow through the first outlet, the second outlet and the third outlet into the liquid holding compartment.

3. A multi-compartment container according to claim 2 wherein there is a single rotatable element between the first, second and third storage compartments that simultaneously controls dispensing of said three distinct liquids into the liquid holding compartment.

4. A multi-compartment container according to claim 3, wherein external, manually adjustable individual flow controls for each different liquid-storage compartment are configured to dispense each liquid from different liquid-storage compartments at predetermined controlled volume ratios.

5. A multi-compartment container according to claim 2, wherein the liquid holding compartment comprises separated first, second and third liquid holding compartments respectively connected to corresponding first, second and third storage compartments by corresponding first, second, and third one-way outlets.

6. A multi-compartment container according to claim 5 that is configured to provide for flow of liquids from said first, second and third liquid holding compartments into respective first, second and third dispensing compartments when said container is inverted between vertical and +30 degrees from vertical.

7. The multi-part container of claim 6 wherein a hinged element over at least one end of each first, second, and third one-way outlets to restrict flow from the respective first, second and third liquid dispensing compartments into the first, second and third liquid holding compartments.

8. A multi-compartment container according to claim 1, wherein controls are present on an exterior surface of the container for controlling flow rate of liquids from respective liquid-storage compartments into a respective dispensing compartment prior to delivery of a final beverage mixture out of the multi-component container.

9. A multi-compartment container according to claim 1 wherein the liquid-storage compartment and liquid holding compartments comprise plastic.

10. A multi-compartment container according to claim 1, wherein at least one liquid storage compartment or delivery compartment is associated with a source of hydraulic pressure to assist flow of liquid.

11. A multi-compartment container according to claim 1, wherein the first and second compartments comprise different liquid products which are allowed to mix within the container in a delivery compartment as a single mixing area as the delivery compartment.

12. A multi-compartment container according to claim 1, wherein individual flow controls for each different liquid-storage compartment are configured to dispense each liquid from different liquid-storage compartments into a delivery compartment at predetermined controlled volume ratios.

13. A multi-compartment container according to claim 1, wherein ratios of individual liquid product dispensed from a first liquid storage compartment and a second liquid-storage compartment into respective delivery compartments is between 1:1 and 10:1.

14. A multi-compartment container having a dispensing end and a bottom,
the container having a longitudinal axis and at least two separate liquid-storage compartments for storing at least three distinct consumable liquids, said liquid-storage compartments each comprising a respective at least first outlet for a first of the at least three liquid-storage compartments, an at least second outlet for a second of the at least three liquid-storage compartments and an at least third outlet for a third of the at least three liquid-storage compartments;
the multi-compartment container further comprising a mixing tap for controlling the flow of liquid from each of said three separate liquid storage compartments into a liquid holding compartment, wherein controlled flow of liquid from each of said three separate liquid storage compartments into the liquid holding compartment forms a beverage liquid mixture and the respective at least first outlet, at least second outlet and at least third outlet for each of the liquid-storage compartments are between respective liquid storage compartments and the liquid holding compartment;
the multi-compartment container further comprising a controllable flow restriction element that rotates about the longitudinal axis, controlling flow from the at least three separate liquid-storage compartments through the first outlet and the second outlet and third outlet;
the container further comprising a dispensing tap which controls flow of the beverage liquid mixture out of the liquid holding compartment;
wherein when the first outlet, second outlet and third outlet are disposed below the bottom of the container and by inversion of the container, the at least three distinct consumable liquids are dispensed substantially simultaneously from the first outlet, second outlet and the third outlet into the liquid holding compartment to form the beverage liquid mixture and the liquid holding compartment is constructed to temporarily prevent the beverage liquid mixture in the liquid holding compartment from flowing out of the liquid holding compartment; and,
wherein the dispensing tap has an open position to allow flow of the beverage liquid mixture out of the liquid holding compartment and a closed position to prevent flow of the beverage liquid mixture out of the liquid holding compartment.

15. A multi-compartment container according to claim 14 wherein there is a single rotatable element between the first, second and third storage compartments that simultaneously controls dispensing of said three distinct liquids into the liquid holding compartment.

16. A multi-compartment container according to claim 15, wherein the liquid holding compartment comprises separated first, second and third liquid holding compartments respectively connected to corresponding first, second and third storage compartments by corresponding first, second, and third one-way outlets.

17. A multi-compartment container according to claim 16 that is configured to provide for flow of liquids from said first, second and third liquid holding compartments into respective first, second and third dispensing compartments when said container is inverted between vertical and +30 degrees from vertical.

\* \* \* \* \*